United States Patent
Krasin et al.

(10) Patent No.: US 9,626,507 B2
(45) Date of Patent: Apr. 18, 2017

(54) HOSTED APPLICATION SANDBOXING (75) Inventors: Ivan Krasin, Mountain View, CA (US); Anand Mistry, Ultimo (AU)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 14/390,977

(22) PCT Filed: Apr. 6, 2012

(86) PCT No.: PCT/RU2012/000262
§ 371 (c)(1),
(2), (4) Date: Jun. 10, 2015

(87) PCT Pub. No.: WO2013/151454
PCT Pub. Date: Oct. 10, 2013

(65) Prior Publication Data
US 2015/0278513 A1    Oct. 1, 2015

(51) Int. Cl.
*G06F 21/53* (2013.01)
*G06F 9/50* (2006.01)
*G06F 9/45* (2006.01)
*G06F 9/48* (2006.01)

(52) U.S. Cl.
CPC ............... *G06F 21/53* (2013.01); *G06F 8/41* (2013.01); *G06F 9/4881* (2013.01); *G06F 9/5005* (2013.01)

(58) Field of Classification Search
CPC .................................. G06F 21/53; G06F 8/41
USPC ..................................................... 726/1, 30
See application file for complete search history.

(56) References Cited

U.S. PATENT DOCUMENTS

| | | | | |
|---|---|---|---|---|
| 9,323,921 B2* | 4/2016 | Hunt | ...................... | G06F 21/53 |
| 2005/0177635 A1 | 8/2005 | Schmidt et al. | | |
| 2007/0192623 A1* | 8/2007 | Chandrasekaran | ..... | G06F 21/54 |
| | | | | 713/189 |
| 2007/0226773 A1* | 9/2007 | Pouliot | ................... | G06F 21/53 |
| | | | | 726/1 |
| 2008/0127142 A1* | 5/2008 | Wrighton | ............... | G06F 21/53 |
| | | | | 717/148 |
| 2008/0256223 A1* | 10/2008 | Chan | ................... | H04L 67/1008 |
| | | | | 709/223 |
| 2008/0307396 A1* | 12/2008 | Broman | .............. | G06F 11/3466 |
| | | | | 717/130 |

(Continued)

OTHER PUBLICATIONS

Richard, "The I-Cluster Cloud: distributed management of idle resources for intense computing", Sep. 2005, vol. 31, p. 813-838.*

(Continued)

*Primary Examiner* — Taghi Arani
*Assistant Examiner* — Gregory Lane
(74) *Attorney, Agent, or Firm* — Fish & Richardson P.C.

(57) ABSTRACT

This specification describes technologies relating to software execution. A sandboxing computer system accesses at least one application file and instantiates a sandbox environment. The sandbox environment does not having allocated, when instantiated, a memory buffer for use by a running application. The application file is run in the sandbox environment to produce an application output. A memory buffer is for use by the running application after the application has begun running, and a client computer system is provided with the application output.

19 Claims, 6 Drawing Sheets

(56) References Cited

U.S. PATENT DOCUMENTS

| | | | |
|---|---|---|---|
| 2009/0183227 A1* | 7/2009 | Isaacs | G06F 9/4443 |
| | | | 726/1 |
| 2011/0154431 A1 | 6/2011 | Walsh et al. | |
| 2011/0179483 A1 | 7/2011 | Paterson et al. | |
| 2012/0297492 A1* | 11/2012 | Court | G06F 9/468 |
| | | | 726/29 |

OTHER PUBLICATIONS

International Search Report and Written Opinion in International Application No. PCT/RU2012/000262, mailed Sep. 6, 2013, 8 pages.

* cited by examiner

HOSTED APPLICATION SANDBOXING

BACKGROUND

This specification relates to software execution.

Computing resources are used by computer programs during execution. The resources include disk space, memory allocation, network bandwidth, and processor cycles.

Modern computers are designed to enable multitasking— the sharing of a single resource among multiple processes.

The client/server model of computing involves a server providing access to an application or resource to one or more clients. The server and clients often, but not always, are separate computing devices that communicate over a computing network (e.g. the Internet). In some cases, a single server can host multiple applications and communicate with multiple clients concurrently.

SUMMARY

A server system can create in-process sandbox environments to host and control execution of a third party application and data. The sandbox environments protecting the rest of the server system, including other third party applications, from the executing applications. These sandbox environments may, for example, limit file access to a specific directory, expose a virtual file system that may not be bound to a computer or data center, provide shell services to the applications, and dynamically allocate hardware resources and network bandwidth to the applications as needed. Resources used by the third party applications may be allocated and billed at a fine-grain level.

In general one innovative aspect of the subject matter described in this specification can be embodied in a system that includes one or more processing devices. The system further includes one or more storage devices storing instructions that, when executed by the one or more processing devices cause the one or more processing devices to implement a work order manager configured to access a work order referencing at least one application file. The work order manager is configured to create, from the work order, one or more jobs associated with the application file. The work order manager is configured to distribute the jobs to one or more process level managers to be processed. The instructions, when executed by the one or more processing devices cause the one or more processing devices to implement a the one or more process level managers configured to process a job distributed to the process level manager by instantiating a sandbox environment. The process level manager is further configured to load the application file into the sandbox environment. The instructions, when executed by the one or more processing devices cause the one or more processing devices to implement one or more sandbox environments configured to run the application file. The sandbox environments are further configured to receive an initial memory buffer for use by the running application after the application file has begun running.

Implementations can include any, all, or none of the following features. The system further includes a metrics and accounting module configured to track, to generate a usage metric, usage of the processing devices and usage of the memory buffer for processing the jobs, the usage metric indicating a usage not substantially more than the usage of the processing devices and usage of the memory buffer. The instructions, when executed by the one or more processing devices cause the one or more processing devices to implement a supervisor configured to receive, from the running application file, a request to run a second application file; determine that the running application file has authorization to access the second application file; and permit the request such that the second application file is run within a sandbox environment. The instructions, when executed by the one or more processing devices cause the one or more processing devices to implement a supervisor configured to receive, from the running application file, a request to access a file; determine that the running application file does not have authorization to access the file; and deny the request such that the running application file cannot access the file. The sandbox environments are further configured to receive a shell command from the running application; and perform actions specified by the shell command. The at least one application file includes a scripted module that has no binary compatibility with the sandbox environment. The at least one application file includes an interpreter configured to interpret the scripted module in the sandbox environment. The at least one application file includes a just-in-time compiler and another module, the just-in-time compiler configured to compile and run the other module. The system is further configured to migrate a running application file to dedicated hardware that is reserved for completion of work orders. The work order manager is under a first administrative control, the work order is received from a computer under a second administrative control, and an output of the work order is provided to a computer under a third administrative control. The first administrative control is controlled by the owner of the system, and where the third administrative control is controlled by a customer of a controller of the second administrative controller.

In general, one innovative aspect of the subject matter described in this specification can be embodied in methods that include the actions of accessing, by a sandboxing computer system that includes a processing device, at least one application file; instantiating a sandbox environment, the sandbox environment not having allocated, when instantiated, a memory buffer for use by a running application; running the application file in the sandbox environment; and allocating a memory buffer for use by the running application after the application has begun running. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations can include any, all, or none of the following features. The method includes tracking, to generate a usage metric, usage of the processing devices and usage of the memory buffer for processing the jobs, the usage metric indicating a usage not substantially more than the usage of the processing devices and usage of the memory buffer. The method further includes receiving, from the running application file, a request to run a second application file; determining that the running application file has authorization to access the second application file; and permitting the request such that the second application file is run within a sandbox environment. The method further includes receiving, from the running application file, a request to access a file; determining that the running application file does not have authorization to access the file; and denying the request such that the running application file cannot access the file. The method further includes receiving a shell command from the running application; and performing actions specified by the shell command. The method further includes migrating a running application file to dedicated hardware that is reserved for completion of work orders. The sandboxing computer system is under a first administrative control, the at least one application file is accessed from a computer under a second administrative control, and the client computer system is under a third administrative control. The third administrative control is controlled by a customer of a controller of the second administrative controller.

In general, one innovative aspect of the subject matter described in this specification can be embodied in methods that include the actions of accessing, by a sandboxing computer system that includes a processing device, at least one application file that includes a scripted module that has no binary compatibility with a sandbox environment; accessing, by a sandboxing computer system, an interpreter configured to interpret the scripted module in the sandbox environment instantiating the sandbox environment; and interpreting the application file in the sandbox environment with the interpreter. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include accessing, by a sandboxing computer system that includes a processing device, at least one application file; accessing, by the sandboxing computer system, a just-in-time compiler configured to compile and run the application file; instantiating a sandbox environment; and just-in-time compiling and running the application file in the sandbox environment with the just-in-time compiler. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include accessing, by a sandboxing computer system that includes a processing device, a first application file; instantiating a first sandbox environment in a first process; running the application file in the first sandbox environment in the first process; accessing, by the sandboxing computer system, a second application file; and running the second application file in a sandbox environment in the first. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations can include any, all, or none of the following features. The first application produces a command to run the second application file. Running the second application file in a sandbox environment in the first process includes instantiating a second sandbox environment in the first process; and running the application file in the second sandbox environment in the first process. The first application file and the second application file are accessed from a first user, the method further including accessing, by a sandboxing computer system and from a second user, a third application file; instantiating a third sandbox environment in a second process; and running the third application file in the third sandbox in the second process. The first sandbox is an in-process sandbox.

Various implementations of the subject matter described here may provide one or more of the following advantages. In one or more implementations, server-side virtual clients can provide a secure and light-weight execution environment for untrusted code. The sandbox environments can support efficient use of computing resources by dynamically allocating memory buffers to hosted application and transferring running processes to dedicated hardware. The sandbox environments can facilitate useful tracking and accounting features such as fine-grain resource monitoring and second-party hosting support. In-process sandbox environments can host multiple third-party applications within one process, supporting efficient use of resources and speed of execution due to decreased number of system calls.

The details of one or more implementations are set forth in the accompanying drawings and the description below. Other features and advantages will be apparent from the description and drawings, and from the claims.

DETAILED DESCRIPTION

Figure 1A:
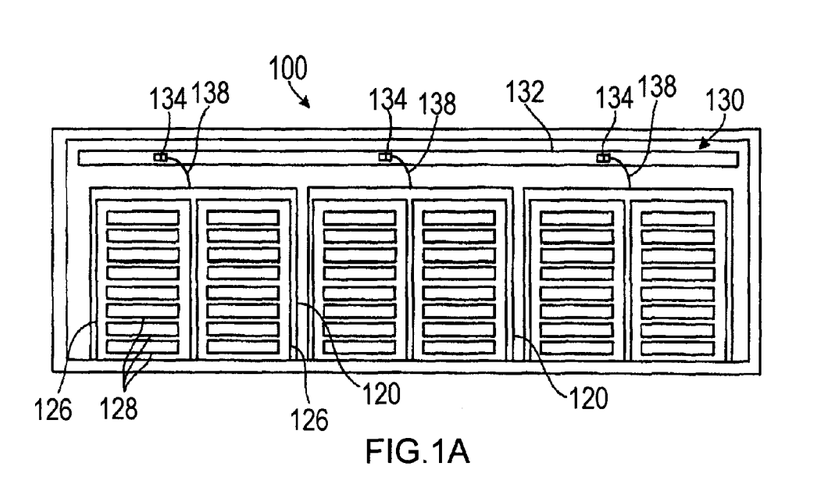
FIGS. 1A and 1B are side and plan views of an example of a facility that serves as a data center.
Figure 1B:
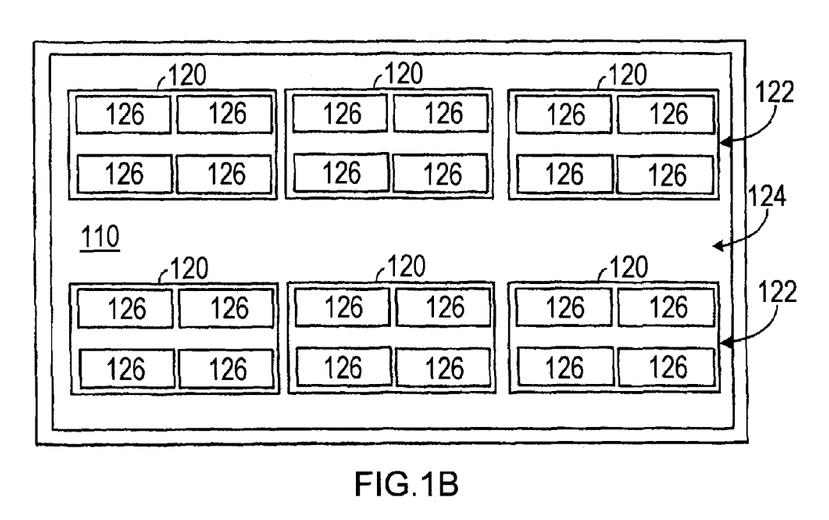

FIGS. 1A and 1B are side and plan views, respectively, to illustrate an example of a facility 100 that serves as a data center. The facility 100 includes an enclosed space 110 and can occupy essentially an entire building, such as a large and open warehouse or shed space, or be one or more rooms within a building. The enclosed space 110 is sufficiently large for installation of numerous (dozens or hundreds or thousands of) racks of computer equipment, and thus could house hundreds, thousands or tens of thousands of computers.

Modules, e.g., cages 120, of rack-mounted computers are arranged in the space in rows 122 that are separated by access aisles 124 in the form of worker walkways. Each cage 120 can include multiple racks 126, e.g., four to eight racks, and each rack includes multiple computers 128, e.g., trays.

The facility also includes a power grid 130, which, in this implementation, includes a plurality of power distribution "lines" 132 that run parallel to the rows 122. Each power distribution line 132 includes regularly spaced power taps 134, e.g., outlets or receptacles. The power distribution lines 132 may be bus bars suspended on or from a ceiling of the facility.

Alternatively, bus bars could be replaced by groups of outlets that are independently wired back to a power supply, e.g., elongated plug strips or receptacles connected to the power supply by electrical whips. As shown, each cage 120 can be connected to an adjacent power tap 134, e.g., by power cabling 138.

A number of facilities may be owned by the same organization and may be geographically dispersed in different geographic areas across one or more states, countries, and/or continents. The facilities may be communicably linked through a data network such as the Internet, or via a private network such as a fiber network owned by a company that operates the facility. Each facility such as facility 100 may have a number of different features. For example, some facilities may have different hardware and software, operating costs, or usage profiles. In addition, each facility may exhibit a partial or total failure from time to time. The failures may be planned, such as when part of a facility is taken off-line for upgrades or maintenance. The failures may also be unplanned, such as when a facility loses electrical power or is subject to a natural disaster.

In some implementations, a group of the computers or all of the computers in the facility 100 may be provisioned as a cluster. The entire cluster can be addressed with a single address and can share workload among the separate computers of the cluster. In some other cases, some of or all of the computers of the facility 100 may act as independent servers. In either case, each server or cluster can be used for similar purposes, and as such, the following description will use clusters as the basis of example computer systems. However, it will be understood that independent servers, instead of clusters, may be used.

Figure 2:
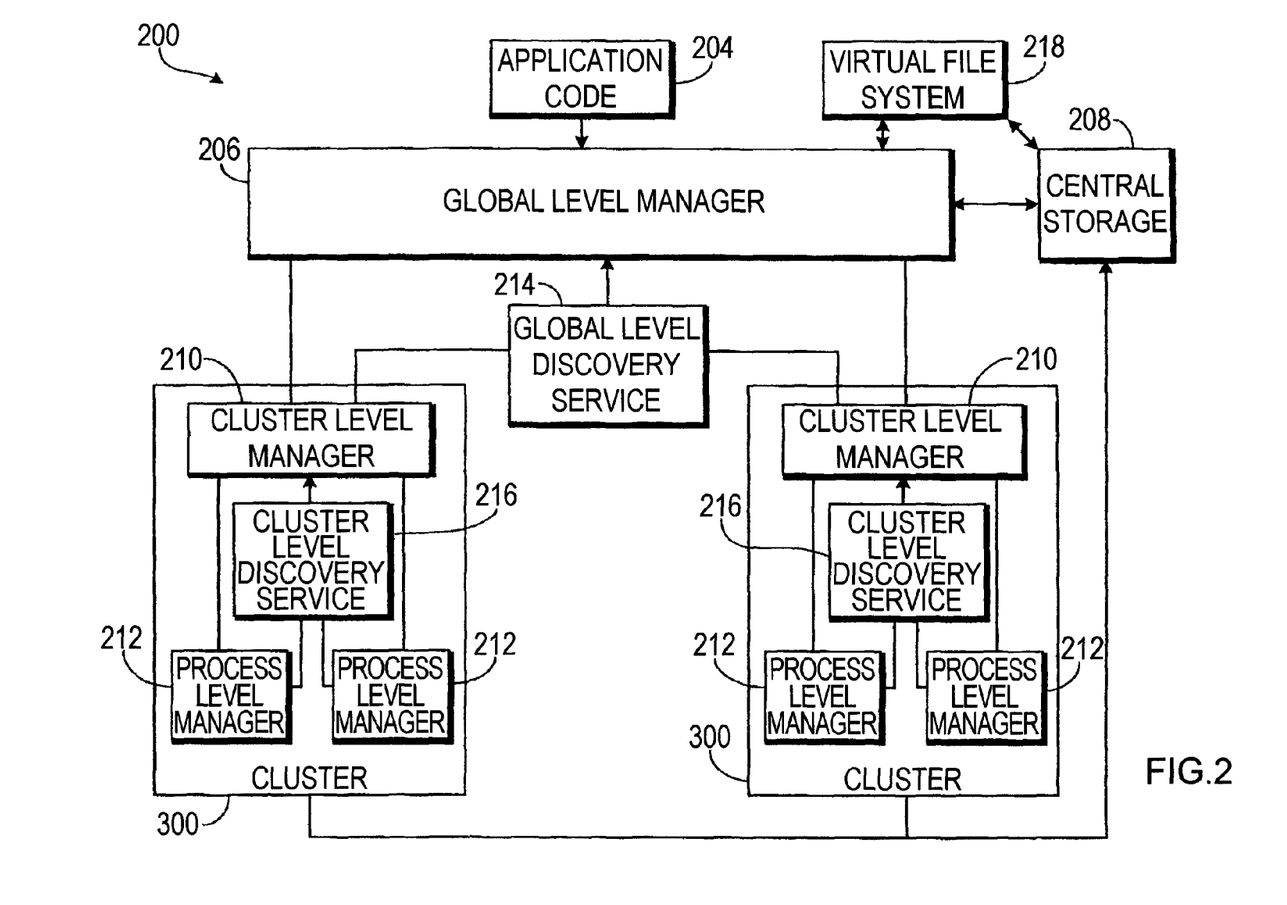
FIG. 2 is a block diagram of an example system for receiving and distributing job to be processed using idle computing resources.

FIG. 2 is a block diagram of an example system 200 for receiving and distributing jobs to be processed using idle computing resources. In some implementations, the system can be used to monetize underutilized central processing unit (CPU) cycles and other computational resources in a distributed computer hardware system. The jobs are in the form of defined computing tasks that may be assigned to particular computers or processes in the system 200, and that may provide useful output to a requester. The discussion here focuses on the interaction of various components at different levels in the system, in processing a job.

In the system 200, a client can submit a work order containing application code 204 to a global-level manager 206 for completion. The application code 204 can be executable or interpretable code written by or for the client that generates some output that is of use or value to the client. The output may take any number of forms, including a graphical user interface (e.g. a graphic user interface for a hosted application such as a game or messaging client) and/or an output file (e.g. a file for a mathematical application that produces a calculation). Example application code 204 can include, but is not limited to, financial analysis code, primary research code and test data created by a university researcher, or a document editor. In some implementations, any code that can be hosted and run may be appropriate for use as the application code 204. The application code 204 can be compiled with one or more frameworks or libraries that provide, for example, communication and distribution capabilities used for compatibility in the system 200.

The global-level manager 206 can receive the application code 204. The global-level manager 206 can also facilitate the storage of the application code 204 in a central storage 208, either directly or by another system. The central storage 208 can serve the application code 204 to other components of the system 200 as requested. The application code 204 may include any necessary files such as data files, input files, or user settings.

The central storage 208 may contain, or be in communication with, a virtual file system 218. The virtual file system 218 may provide, for example, flat or hierarchical data storage to elements within the system 200 as well as users of the system 200. As such, the application code 204, when run, as well as the client that uploaded the application code 204 may access the virtual file system to read and write data. This virtual file system may be independent from any particular group of machines, and may, for example, represent the storage resources of many machines with a single unified interface. The central storage 208 can include storage facilities that are located at a number of geographically-dispersed facilities 100. The application code 204 can be initially uploaded to a central storage facility that is geographically near the uploading client, and then can be replicated across a regional, national, or international domain.

The client can initiate a work order by issuing an execution request to the global-level manager 206. The execution request can include the file name of the application code 204 within the virtual file system. The execution request can also include information about how the application code 204 should be run. For example, the client may include arguments to be used when running the application code 204.

The system 200 can use a multi-tiered, such as a three-tiered, model for job distribution and completion. For example, a global-level manager 206, acting as the top tier, can distribute jobs from the work order to cluster-level managers 210 in the second tier. The cluster-level managers 210 can register with a global-level discovery service 214 to post their availability to accept jobs. Each cluster-level manager 210 can further distribute the jobs to process-level manager 212. The process-level manager 212 can register with a cluster-level discovery service 216 that is associated with their cluster to post their availability to accept jobs.

In some implementations, the cluster-level discovery service 216 and the global-level discovery service 214 are services that are shared by other systems that are running on the same clusters and networks. The cluster-level discovery service 216 and the global-level discovery service 214 can be configured as database tables in databases shared by many systems.

In some implementations, responsibilities are assigned to the lowest tier possible. For example, the cluster-level manager 210, not the global-level manager 206, can be responsible for distributing jobs to process-level manager 212. Information about the completion of jobs (e.g., job, opportunistic termination, assignments) can be transmitted up to the global-level manager for, for example, global coordination and reporting.

As the jobs run, they can access the virtual file system 218. For example, a particular job may access data files in the virtual file system 218, write output files to the virtual fie system 218, or use the virtual file system 218 for any other appropriate use. Each client may have an account with the virtual file system 218, and the system 200 may be configured such that only jobs from that client may access data associated with that user. Alternatively, some clients may share data in the virtual file system, and the jobs may be permitted by the system 200 to access this shared data.

Figure 3:
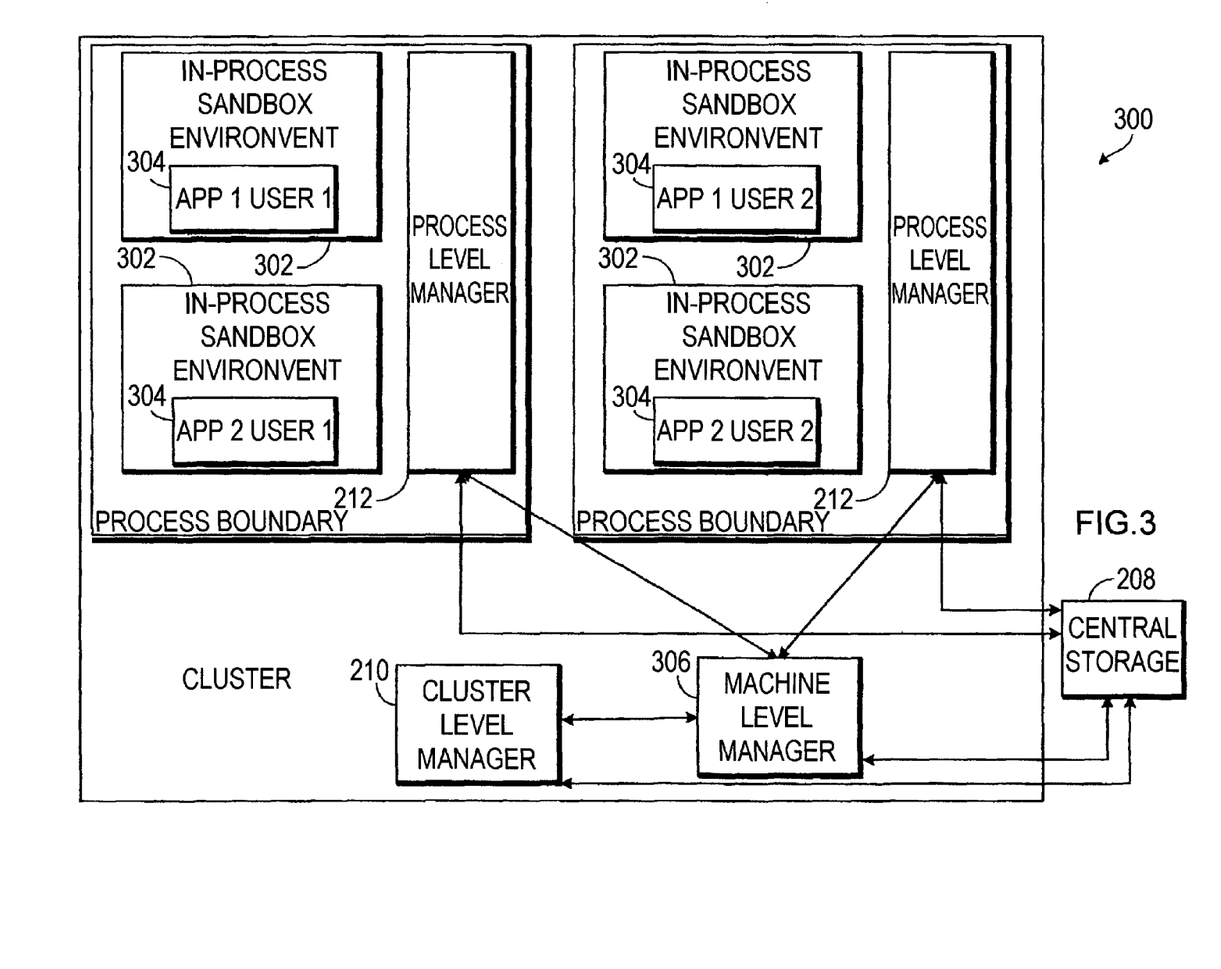
FIG. 3 is a block diagram of an example cluster for processing jobs using idle computing resources.

FIG. 3 is a block diagram of an example cluster 300 for processing jobs using idle computing resources. The cluster 300 is a group of computers or processes running on computers that can be treated together as a defined group, and may be on the order of hundreds or thousands of processors or processes. The cluster 300, in some implementations, can be defined in the facility 100. The cluster 300 can include one cluster-level manager 210, one machine-level manager 306 and multiple process-level managers 212, with one process per process-level manager 212. The cluster 300 may be used in a facility 100 that has homogeneous or heterogeneous hardware. For example, the computers 128 may have different arrangements of CPUs, available memory, etc., or the computers 128 may be collection of completely different computers sold by different vendors with different features.

The cluster-level manager 210 can be a long-running job that runs at production priority (i.e., a higher priority than the jobs to be distributed). The cluster-level manager 210 can receive jobs from the global-level manager 206 and pass them to the machine-level manager 306 to assign those jobs to the individual process-level manager 212. The machine-level manager 306 can assign all jobs from the same client to the same process-level managers 212. By keeping all jobs from the same client within the same process, overhead for exchanging data between applications of the same client may be reduced. In some configurations, system calls for this type of data passage may be eliminated and the cluster 300 can provide a zero-copy datagram interface to the applications of the same client.

The cluster-level manager 210 can share information with the global-level manager 206. For example, the cluster-level manager 210 can record the job that is assigned to each process-level manager 212 and can monitor the progress of the job.

The machine-level manager 306 monitoring the usage of the hardware resources of the cluster 300. For example, when machine-level manager 306 determines that the current load of the hardware resources are too high, the machine-level manager 306 can report to the cluster-level manager 210. In response, the cluster-level manager 210 can read the state of the hardware from the central storage 208 and may issue commands to migrate one or more jobs from one machine to another.

The process-level manager 212 can be a job running at a lower priority than the cluster-level manager 210, but at a higher priority level than the jobs to be distributed. The process-level manager 212 can create and manage multiple in-process sandbox environments 302, each sandbox environment 302 hosting a worker 304 created from the application code 204 to complete an assigned work assignment. The worker 304 processes the job and reports the results to the process-level manager 212. In some cases, some sandbox environments 302 can host multiple workers.

In some implementations, the worker 304 can access the virtual file system 218 to access data needed to process the jobs. To access the virtual file system 218, the jobs can send a request to the process level manager 212. The request is then forwarded to the central storage 208, and then to the virtual file system 218. The worker 304 may store or otherwise interact with data from the virtual file system 218 using a similar request. The virtual file system 218 may use some of the resources of the cluster (e.g., local disk caches and random access memory) for temporary data storage. Examples of functions of the virtual file system 218 that may be used by the worker 304 include, but are not limited to, open, read, write, close, and seek. Some of these functions may be restricted, for example, based on files used in the operation.

In some implementations, the number of process-level managers 212 in a cluster 300 may be constant. For example, each and every computer 128, or a constant subset of the computers 128, may have a set number of process-level managers 212. Alternatively, the number of process-level manager 212 in the cluster 300 can vary according to, for example, the load of jobs received by the cluster-level manager 210. In this case, the machine-level manager 306 can launch and destroy process-level manager 212 (which runs as software processes) as needed. The workers 304 associated with a particular process-level manager 212 may be from the same customer or client, and may use some of the same data from the virtual file system 218.

Figure 4A:
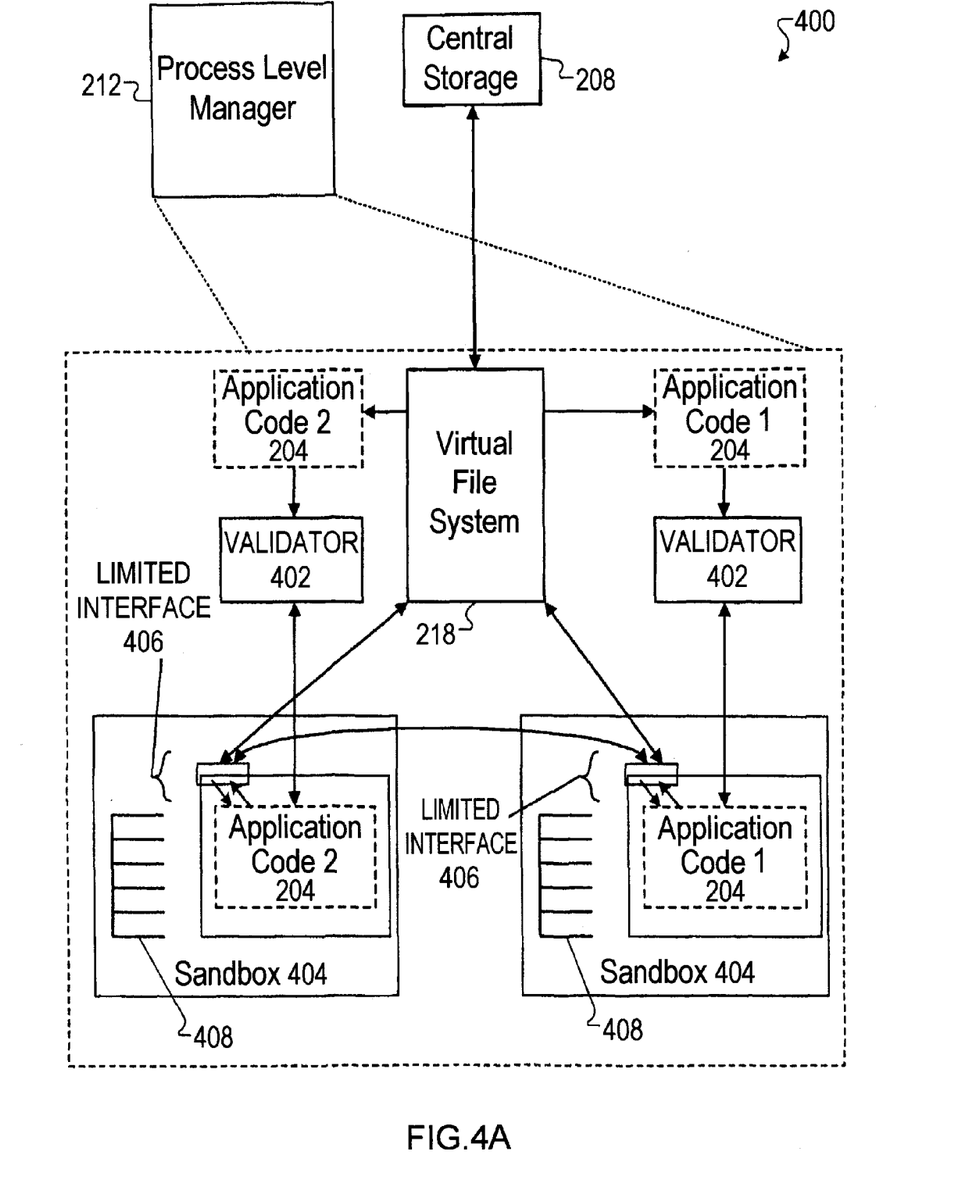
FIG. 4A is a block diagram of an example system to execute untrusted code modules.

FIG. 4A is a block diagram of an example system 400 to execute untrusted code modules, such as the application code 204. The described techniques can be used to: execute and/or extend untrusted stand-alone applications in a cluster or server environment; allow user enhancement of specialized environments such as game consoles, where allowing users to extend application functionality in a protected (but high-performance) manner may be desirable; safely execute email attachments; and enhance scripting environments by safely using native code to speed up critical and/or compute-intensive code sections.

In the description that follows, the system 200 and the cluster 300 are being used as the basis of an example. However, other systems or groups of systems may use sandbox environments. For one such other system, see the system 500 with respect to FIG. 5 below. It will be understood that a sandbox environment can be created by any suitable computer system capable of hosting applications or other software.

When the process-level manager 212 receives a request to run application code 204 from the virtual file system 218, the application code 204 can validated by validator 212 as it is loaded into a sandbox environment 404. If validator 212 determines that the application code 204 is not compliant with a set of validation rules, the validator can reject the application code 204 such that the application code 204 is not executed. Otherwise, if the application code 204 passes validation, the system 400 can treat the application code 204 as safe to execute in the sandbox environment 404.

During execution, sandbox environment 404 provides a limited interface 406 between the application code 204 and other software entities and hardware resources. The interface 406 moderates all external requests made by the application code 204 as well as the way in which these requests are made.

The sandbox environment 404 can dynamically allocate resources to the application code 204, for example on a per-need basis. For example, when the application code 204 is loaded, the sandbox environment 404 may not allocate, or have allocated, a memory buffer 408 for running the application code 204 or for use by the application code 204. In this example, the memory buffer 408 can be allocated by the process-level manager 212 when the memory buffer 408 is. The process-level manager 212 can, before allocating the memory buffer 408, determine that there is available system memory on the machine hosting the sandbox environment 404. If system memory is available, the process-level manager 212 can request memory from the machine-level manager 306. If the machine-level manager 306 is able to allocate the memory, the process-level manager 212 can allocate the memory to the sandbox environment 404. If the machine-level manager 306 is unable to allocate the memory, the process level manager 212 can report to the cluster-level manager 210. The cluster-level manager 210 can migrate the application code 204 to a machine without enough free resources to run the application code 204 with the requested memory.

Once allocated, the memory buffer 408 may be resized. For example, the process-level manager 212 may increase or decrease the size of the memory buffer 408 as the size needed by the application code 204 changes. In some implementations, a dynamic memory buffer 408 may contribute to a more efficient system 400 than a static memory buffer would. For example, by allocating only as needed, unused memory may be freed from one sandbox environment 404 and allocated to another sandbox environment 404. In another example, fine-grain accounting techniques can use the size of the memory buffer to determine a customer usage such that the customer is only billed for memory space actually used.

In some implementations, the system allows safe execution of the application code 204 in the form of an x86 binary code module in the cluster 300, thereby enabling the application code 204 to serve as an application component that can achieve native performance but is structurally constrained from accessing many of the components of the cluster 300. Although the following description uses the Intel x86 processor architecture, the techniques described are not limited to this architecture, and can be applied to a wide range of processor and/or hardware architectures (e.g., the PowerPC and ARM architectures).

In addition to, or as an alternative to, binary code modules, the application code 204 can also include scripted code modules. Examples of script languages that may be used to create scripted code module include, but are not limited to, PHP, Python, and Ruby. These scripted modules can be interpreted by the sandbox environment 404 or by an interpreter in the sandbox environment 404 (not shown).

The scripted modules may have no binary compatibility with the sandbox environment 404. Many scripting languages are cross-platform or platform-agnostic and can be used in any environment that includes a valid interpreter. Although a scripted module may not need to have binary compatibility with the sandbox environment 404, it may need to include, or have access to, libraries and or functions specified by the sandbox environment 404. The example compilation chains discussed below describe some of these libraries and functions.

Some application code 204 can include both native binary and scripted modules. These modules may work together to accomplish a single goal, with functionality in either the native binary or scripted modules according to the choices of the designers of the application code 204. One example of such a configuration is when the designer wishes to use a commercial off-the-shelf (COTS) native binary library, e.g., a C++ math library, with a custom developed scripted module, e.g., a Python application that requires complex calculations.

Another such configuration is when the native binary module is an interpreter for the scripted module. In this case, the interpreter performs, within the sandbox environment 404, the instructions of the scripted module. This configuration may support, for example, development and use of scripted modules of any arbitrary scripting language with little or no modification to the sandbox environment 404 on a language by language basis.

Similarly, the native binary module may be a just-in-timer (JIT) compiler for the scripted module. In this scenario, the JIT compiler can compile and run the instructions of the scripted module. In addition to supporting development of scripted modules of any arbitrary scripting language, the use of a JIT compiler can support a number of benefits that are common to JIT compilation including, but not limited to, late binding of data types and more efficient execution than traditional interpretation.

In certain embodiments, systems can provide the following features:

Protection: Untrusted modules cannot have unwanted side effects on a host process or any other part of the system, including other untrusted modules. Furthermore, untrusted modules cannot communicate directly with the network. The system prevents untrusted modules from making system calls, thereby preventing such untrusted modules from using such system calls to exploit system vulnerabilities by directly creating or modifying files in the file system, starting processes, engaging in clandestine network communications, etc. The untrusted module relies entirely on the secure runtime environment for access data services, with the secure runtime environment taking full responsibility for the safety of the services provided.

Privacy: The system ensures that untrusted modules cannot read or write data to which they have not been explicitly granted access. By loading each module into different sandbox environments, the system can prevent a module in one sandbox environment from accessing data in another sandbox environment. Therefore, data and modules of one user are inaccessible to modules of another user, even if both modules are running on the same hardware.

Operating System Portability: The system allows untrusted modules to be executed on any operating system that supports the secure runtime environment (e.g., for the x86 architecture, untrusted modules could be supported in the WINDOWS, MACOS, and LINUX operating systems.

Multi-threading: Untrusted modules may be multi-threaded.

System Implementation and Performance: The system is optimized to need only a small trusted code base, thereby facilitating portability, security audits, and validation. The system provides performance for compute intensive modules that is comparable to unprotected native code Ease of Module Implementation: External developers can easily write and debug modules to be executed in the system using familiar tools and programming techniques.

Processor portability: The application code 204 may be in a portable format (e.g., a processor-agnostic bytecode). The portable format application code 204 may be translated to the processor architecture used in the sandbox environment 404, passed to the validator 402, and executed. Operations on running application code 204 such as suspend, resume, and migrate may be available across the machines with the same processor architecture.

Note that the described system may simultaneously address both performance and portability issues while eliminating security risks, thereby allowing developers to use portable, untrusted native-code modules in their applications without requiring application users to risk the security of their devices and/or data.

In some implementations, the system includes: a modified compilation chain that includes a modified compiler, assembler, and linker that are used to generate safe, compliant executable program binaries; a loader/validator 402 that loads the module into memory and confirms that the untrusted module is compliant with a set of code- and control-flow integrity requirements; and a runtime environment that provides data integrity and moderates both the module's ability to access resources and how the module accesses such resources. The compilation and validation processes ensure that unwanted side effects and communications are disabled for the untrusted module, while the secure runtime environment provides a moderated facility through which a limited set of desirable communications and resource accesses can safely occur. These components are described in more detail in the following sections.

In some implementations, complementary compilation and validation processes ensure that only safe native code modules are created and loaded into the system. The compilation process involves using a compiler, an assembler, and a linker which work together to generate a system-compliant binary native code module. The validator 402 loads this native code module into memory, and confirms that the native code module is indeed system compliant. Note that validating the compiled module at load time (as the last action prior to execution) allows the system to use (but not trust) the output of the compiler. Such validation can also detect any malicious actions that attempt to compromise the safety of the native code module between compilation and execution.

Note that the system can use a combination of compiler-based techniques and static binary analysis (e.g., analysis of assembly code during validation) to achieve safety with lower execution overhead than dynamically analyzing and rewriting executable code at runtime (as is commonly done in some conventional virtual machine environments). Additionally, static binary analysis facilitates implementing the validator 402 and runtime environment in a small trusted code base, thereby facilitating security verification for the code base and reducing the likelihood of bugs and/or vulnerabilities. In some embodiments, however, the system may also use dynamic analysis and code-rewriting techniques.

In some implementations, creating a system compliant native code module involves following a set of restrictions and/or policies that preserve the integrity and security of code, control flow, and data. Preserving code integrity involves ensuring that only "safe" instructions can be executed by the native code module, and that no unsafe instructions can be inserted at runtime using dynamic code generation or self-modifying code. Restricting the instruction set which is available to the native code module also can help to make decoding the native code module (during validation) more reliable. Preserving control flow integrity involves ensuring that control flow instructions in the native code module cannot violate security by calling instructions outside of the native code module. Preserving data integrity involves ensuring that a native code module cannot perform "wild reads" or "wild writes" (e.g., reads or writes outside of a specified data region associated with the native code module).

In some implementations, the validator 402 helps to achieve code, control-flow, and data integrity for an x86 native code module in part by ensuring that a set of "unsafe" instructions from the x86 ISA (instruction set architecture) are not included in a native code module. For instance, the validator 402 may disallow the use of the following instructions and/or features in a native code module:

- the syscall (system call) and int (interrupt) instructions, which attempt to directly invoke the operating system;
- all instructions that modify x86 segment state (including LDS, far calls, etc.), because these instructions interfere with the memory segments that are used to enforce data integrity (see the segmented memory description below);
- the rdtsc (read time stamp counter) and rdmsr (read from model specific register) instructions, as well as other hardware performance instructions and/or features which may be used by a native code module to mount side channel attacks (e.g., by covertly leaking sensitive information);
- various complex addressing modes that complicate the verification of control flow integrity;
- the ret (return) instruction, which determines a return address from a stack location, and is replaced with a sequence of instructions that use a register specified destination instead (and hence is not vulnerable to a race condition that allows the stack location to be used as a destination by a first thread to be overwritten maliciously (or erroneously) by a second thread just prior to the execution of the return instruction); and
- some aspects of exception and signal functionality—for instance, while the system may support C++ exceptions (as defined in the C++ language specification), the system may not support hardware exceptions (such as divide-by-zero or invalid memory reference exceptions) due to operating system limitations, and may terminate execution of an untrusted native code module when faced with such a hardware exception.

Furthermore, to provide effective code discovery and control integrity, the system also restricts a set of control transfer instructions. Specifically, unmodified indirect control flow instructions that can transfer execution to arbitrary locations in memory need to be modified to guarantee that all indirect control flow targets are in memory regions that are valid for the native code module. Some implementations can limit indirect control flow instructions by: (1) not allowing return, far call, and far jump instructions, (2) ensuring that call and jump (jmp) instructions only use relative addressing and are encoded in a sequence of instructions such that the control flow remains within the native code module; (3) ensuring that register indirect call and jump instructions are encoded in a sequence of instructions such that the control flow remains within the native code module and targets valid instruction addresses within the module; and (4) not allowing other indirect calls and jumps.

Figure 4B:
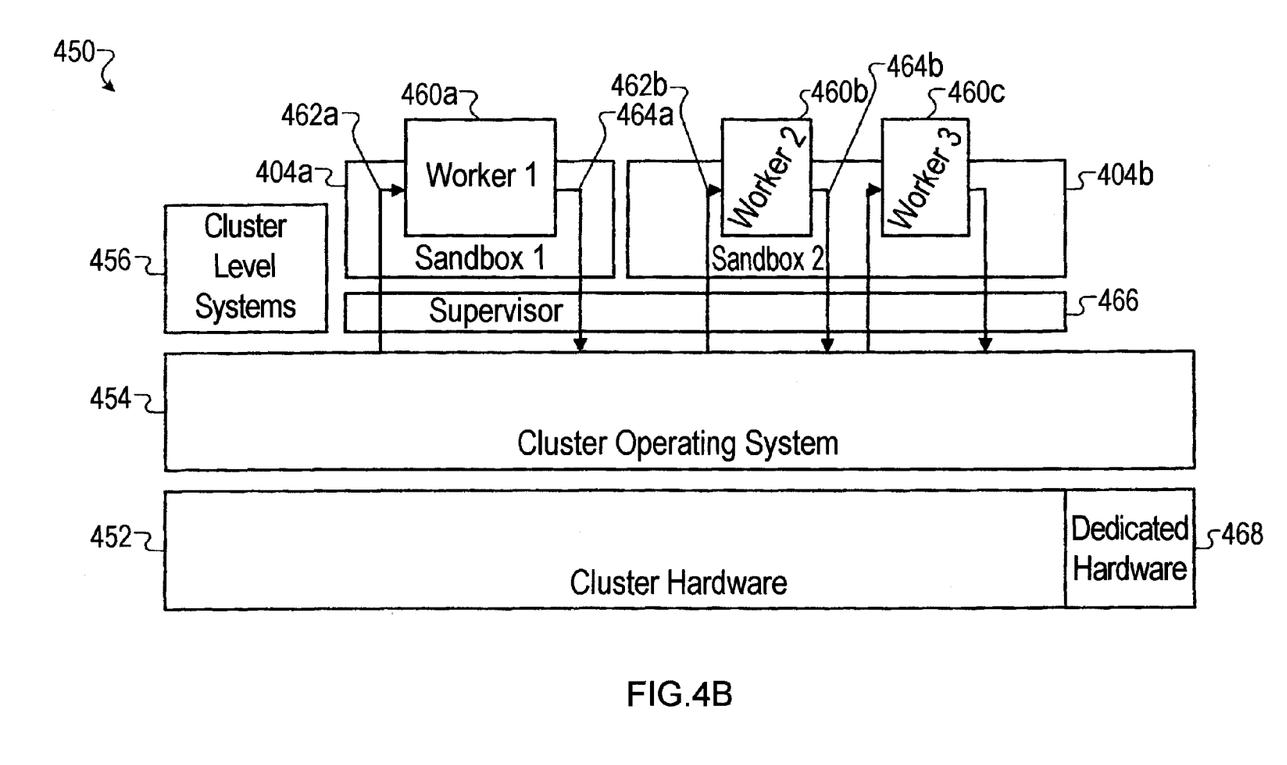
FIG. 4B is a block diagram of an example system for hosting workers in sandbox environments.

FIG. 4B is a block diagram of an example system 450 for hosting workers in sandbox environments. In some implementations, the system 450 can be used to ensure that each worker in the system 450 is able to execute separately with access limited to only appropriate input and output files.

Cluster hardware 452 includes any hardware, such as the facility 100 used to create the cluster 300. A cluster operating system 454 is the operating system and support systems that, among other tasks, facilitate communication between cluster-level entities 456. The cluster-level entities 456 include the cluster-level manager 210, the process-level manager 212, the cluster cache 308, the virtual file system 218, and any other cluster entity that communicates relatively freely inside or with the cluster 300. It will be understood that communications between cluster-level systems 460 may be subject to a range of security restrictions, encryption, logging, etc. It will be further understood that other, non-cluster, computer-systems (e.g., single servers) create sandbox environments to host workers.

The workers 460 execute in sandbox environments 404 and are subject to tight control on available input 462 and output 464. Example of the input 462 and output 464 include, but are not limited to, reading and writing to the virtual file system 218. The sandbox environments 404 are created by the process-level manager 212 and provide execution space and limited communications functionality to the workers 460. The workers 460 are instances of executing processes created by the application code 204 supplied by the customers of the system 200. In some implementations, the sandbox environments 404 are light weight computational structures that require less resource overhead than, for example, virtual machines. Virtual machines, unlike a sandbox environment, emulate physical computer hardware or a full physical machine. Virtual machines often also instantiate a full or partial operating system, which the sandbox environments 404 need not do. Additionally, virtual machines often provide full, or nearly full, system APIs to hosted applications where sandbox environments may provide limited versions APIs that do not support all functions of the API.

The sandbox environments 404 can provide services to the workers 406. These services can include system calls or functions that can be accessed, for example, as remote procedure calls (RPCs) by the workers 406. In some cases, the sandbox environments 404 can provide a shell interface to the workers 406 for accessing the services. Shells, as used here, include interfaces and wrappers to services. The shells often, but do not always, have a text-based language of commands. The shells can receive these commands and perform, or cause another component to perform, the action specified by the commands. Example shells that may be provided by the sandbox environments 404 include, but are not limited to, the Bash Shell and the Secure Shell (SSH).

One service that can be provided by the sandbox environments 404 to the workers 406 is dynamic memory allocation. In some cases, the workers 404 can use RPCs to the process-level manager 212 to allocate memory space for storing data. Additionally or alternatively, the sandbox environments 404 can monitor the memory usage of each worker 406 and free memory that is not being used.

Another service that can be provided by the sandbox environments 404 is process migration. In some cases, the system 450 may include dedicated hardware 468. This dedicated hardware 468 may be computational resources (e.g. processors and memory) set aside specifically for the purpose of running workers 460. For example, if the workers 460 are normally run using spare resources of the cluster hardware 452, some workers may run slower than they are designed or permitted to when the load of the cluster hardware 452 rises. In this scenario, a sandbox environment 404 hosting a late-running worker 464 can migrate one or more processes of the sandbox environment 404 and/or worker 464 to the dedicated hardware in order to speed up the running of the worker 460. In some implementations, this migration, as well as, for example, suspend and resume features, are made possible due to the fact that the workers 460 are isolated from the cluster operating system 454.

The input 462 and output 464 channels available to the workers 460 can be limited to basic file operations and socket functionality to allow the workers 460 to access the data in the virtual file system 218. In some implementations, the file access interface can be a subset of the UNIX file API, and the socket API can be the UNIX socket API. The subset of the UNIX file API can be limited to only the OPEN, READ, WRITE, and CLOSE functions.

To the workers 460, the input 462 and output 464 are presented as oriented communication channels that permit the transmission of, for example, structured, serialized data. That is, input 462 is only for receiving data and output 464 is only for sending data. The structure of the data required by the sandbox environments 404 can be specified in one or more frameworks that are required for compiling the input file 202.

Input 462 and output 464 between the cluster operating system 454—and thus any cluster-level system 456 or system in communication with the cluster operating system 454—and the sandbox environment pass through a supervisor 466. The supervisor 466 can perform policy checking and other security functions to ensure that the workers 460 only have access to read the and write to permitted directories within the virtual file system 218. For example, any read call specifying a memory value or name space not in the associated user's directory in the virtual file system 218 can be denied. In some implementations, some or all of the reads and writes to the virtual file system 218 passing through the supervisor 466 are RPCs made by the workers 406 to the sandbox environments 404 that pass through the supervisor 466 to the cluster operating system 454.

The sandbox environments 440, the supervisor 466, and the cluster operating system 454 can all share the same file descriptors and namespace for a user's data in the virtual file system 218. The sandbox environment 404 can provide the file descriptors to the worker 460 upon request. As such, the only source for valid file descriptors available to the worker 460 may be the sandbox environment 404. In some implementations, the worker 460 can request many input or output file descriptors when it begins processing a job, append data to the end of the output files, and then close the files before terminating. The use of sandbox environments for sandboxing as opposed to, for example, virtual machines, permits use of worker 460 that have been designed and programmed using imperative algorithms. Once the file descriptors is provided to the worker 460, the worker 460 can actively request the file if and when it is needed, it does not need to wait to request the file.

In some examples, the worker 1 460a and the worker 2 460b may be created from application code 204 from two different clients. In such a case, the worker 1 460a and the worker 2 460b are unable to access the same data in the virtual file system 218—each is restricted to only the data in the virtual file system 218 supplied by the same client for the same work order. In some other examples, the worker 1 460a and the worker 2 460b may be associated with the same client and the same work order. In this case, both the worker 1 460a and the worker 2 460b may be able to access at least some of the same data in the virtual file system 218.

The workers 460 may also be permitted to access files that are included in the application code 204. Some of these files may include data files, e.g., small text files holding configuration information. Other files may be scripted modules or native binary modules. These modules may not be at the normal entry point for the application code 204 and thus may not necessarily be run when the worker 460 is created.

For example, an application code 204 may include two modules. The first module, which is the entry point of the application code, is run to create the worker 462b. At some point, the worker 462b may access the second module and create a worker 3 460c. The sandbox environment 2 404b may permit this access request, for example, because the second module was received in the same application code 204 as the first module.

To start the second module, the worker 462b can issue an exec request that specifies the path of the second module in the virtual file system 218, as well as, for example, any execution arguments that are needed. In response, the process-level manager 212 can read the second module, pass the second module through the validator 402, and start the worker 462c in the same sandbox environment 404 and, by extension, the same process. The worker 462c may inherit virtual file handles opened by the worker 462b, allowing the workers 462b and 462c to communicate with each other. This communication may be facilitated by the process-level manager without the use of system calls using, for example, a pipe between the workers 462b and 462c In some implementations, the policy checking that the supervisor 466 performs can be specified by or performed by a third party (or a software system provided by a third party). For example, a third-party regulatory or trusted computing authority may be entrusted with creating or adding to the functionality of the supervisor 466 in order to provide extra assurance to customers or ensure compliance with legal requirements. Additionally or alternatively, the customer that supplied the application code 204 used to create the worker 460 may add to or specify the behavior of the supervisor 466.

Figure 5:
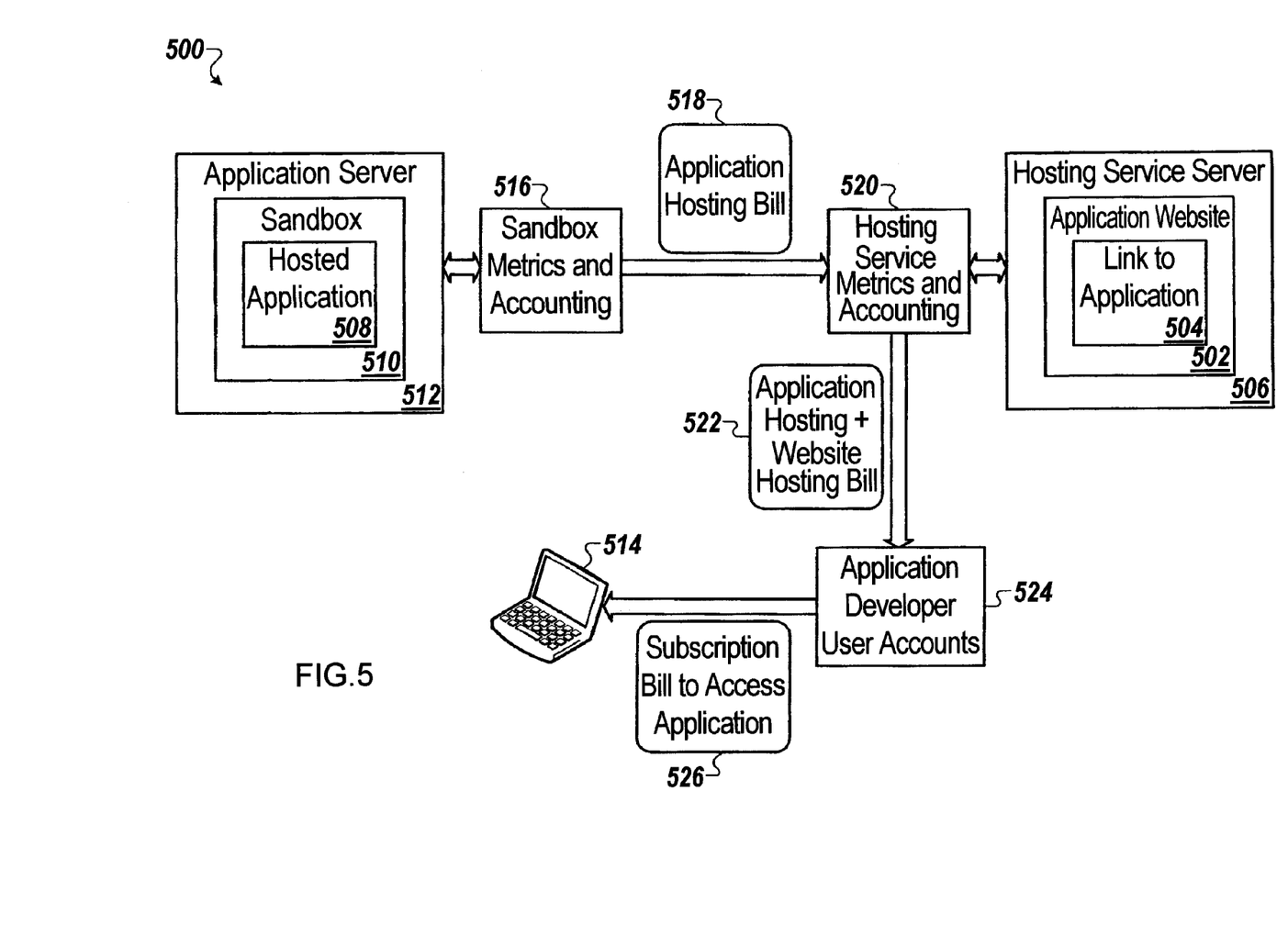
FIG. 5 is a block diagram of an example system for hosting an application.

FIG. 5 is a block diagram of an example system 500 for hosting an application. In this example, a web hosting company is contracting with a sandbox environment hosting company to provide customers with a hybrid web and sandbox environment hosting package. Although the web hosting and sandbox environment hosting companies are separate in this example, it will be understood that other arrangements are possible, including a single company offering both web hosting and sandbox environment hosting directly.

Additionally, in this example an application developer has developed an application primarily for customers, not for themselves. It will be understood that in some cases, the application developer may be the primary audience for the application. For example, a researcher may develop an application to solve some problem that the researcher is interested in. In this case, the researcher is both the designer of the code and the primary user.

In the system 500, the web hosting service hosts an application website 502 for the application developer. The application website 502 is a collection of HTML and similar web pages that can include, for example, a link to the application 504, user forums, how-to's, tutorials, and documentation for the application.

The web hosting service can host the application website 502 on one or more hosting service servers 506. The hosting service servers 506 may by physical or virtual servers located in one or more datacenters that are under administrative control of the web hosting service. Administrative control, as used here, includes permissions and/or abilities to set or change the settings of a computer device, to provision the resources of a computer device to a particular task, or to otherwise control the overall behavior of the computer device. In addition to hosting the application website 502, the hosting service servers 506 may also provide, for example, backup data storage, email services, and other appropriate services for the application developer.

The hosted application 508, however, may not necessarily be hosted by the hosting service server 506. In this example, the hosted application 508 is hosted in a sandbox environment 510 in an application server 512. The application server 512 is one or more servers owned by, and under administrative control of a sandbox environment service provider. The application server 512 may contain many different sandbox environments, each sandbox environment containing one or more hosted applications from different application developers.

A user device 514, which is under the administrative control of a user that is a customer of the application developer, can access the application website 502 and the hosted application 508. The user device 514 may be any computing device capable of rendering a hosted application. Example user devices include, but are not limited to, desktop computers, mobile devices, tablet computers, televisions, and gaming consoles. The user may, for example, need to provide authentication to the application website 502 and/or the hosted application 508 before use. To the user, the hosted application 508 may provide data to render the application, e.g., an application graphical user interface, on the user computer 514 as part of the application website 502, providing the user with a coherent experience.

A sandbox environment metrics and accounting server 516 can track the usage of computing resources that are used to host and serve the hosted application 508 to the user computer 514 and other user computers (not shown). The computing resources include, but are not limited to, memory, processor, network, and disk use. These metrics may be used to determine a bill 518 to the web hosting service in exchange for hosting the hosted application 508.

One technique for usage tracking and accounting that the sandbox environment metrics and accounting server 516 can use is called block accounting. Block accounting involves allocating so-called "blocks" to resource usage. For example, if the hosted application 508 uses a processor for a length of time up to an hour, the hosted application 508 can be assigned that processor for a block of one hour and the bill can include a charge for the use of one processor-hour. Similar blocks can be used for other resources such as memory blocked by time and/or amount of memory, data transfers, and disk usage.

Alternatively, the sandbox environment metrics and accounting server 516 can use fine-grain accounting. Fine-grain accounting involves measuring and accounting actual resource usage. In the example of a hosted application 508 using a processor for a length of time up to an hour, the hosted application 508 is assigned that processor only for the length of time used and the bill can include a charge for the usage of a partial processor-hour. Similarly, actual usage of other resources can be tracked and billed. A hosted application using a memory buffer of 1 gigabyte for 1 hour and 2 gigabytes for 0.75 hours can be billed 2.5 gigabyte-hours. It will be understood that a certain amount of rounding or truncating is permitted in fine-grain accounting. For example, a bill may be rounded to the nearest dollar or cent, or the use of a resource may be rounded to the nearest second or microsecond. In general, most usages of a resource—e.g., hours—will be greater than the amount rounded—e.g., minutes. In some cases, the sandbox environment metrics and accounting server 516 can use block accounting for some resources and fine-grain accounting for other resources.

The sandbox environment metrics and accounting server 516 can generate an application hosting bill 518 and transmit the bill 518 to a hosting service metrics and accounting server 520. It will be understood that, in addition to directly sending a bill to a server, other methods of transferring a bill are possible. For example, the sandbox environment and metrics accounting 516 can send the bill 518 to a bank or other financial intermediary of the hosting service.

The hosting service metrics and accounting server 520 can create a bill 522 with charges for both application hosting and website hosting. The hosting charges may include a line-item charge that specifically identifies the charge of the application hosting bill 518, or the charges of the application hosting bill 518 may be incorporated into a bundle with the website hosting charges.

The hosting service metrics and accounting server 520 may incorporate the information in the application hosting bill 518 into the bill 522 for the application developer. This bill 522 can include all charges for hosting both the application website 502 by the hosting service server 506 and for hosting the hosted application 508 by the application server 512. The hosting service metrics and accounting server 520 may track and bill usage of the hosting service server 506 in essentially any of the same ways that the sandbox environment metrics and accounting server 516 tracks the usage of the application server 512.

An application developer user accounts server 524 can generate a subscription bill 526 for user access to the application website 502 and/or the hosted application 508. The bill 526 may or may not include individual or bundled charges for access the hosted application 508 and the application website 502. For example, if the bills 518 and 520 include information about individual user charges, or if the application website 502 and/or the hosted application 508 record information about user activity, the bill 526 may include charges based on the user's use. In other implementations, the user may be charged a flat fee bill.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
   one or more processing devices;
   one or more storage devices storing instructions that, when executed by the one or more processing devices cause the one or more processing devices to implement:
   a global level manager configured to:

receive a first work order referencing a first application file;

receive a second work order referencing a second application file, the second work order and the second application file being different than the first work order and the first application file;

generate, from the first work order, a first job associated with the first application file and generate, from the second work order, a second job associated with the second application file;

a first cluster level manager configured to indicate, to the global level manager, an availability to accept a job based on available computing resources, and in response, receive the first job from the global level manager and distribute the first job;

a second cluster level manager configured to indicate, to the global level manager, an availability to accept a job based on available computing resources, and in response, receive the second job from the global level manager and distribute the second job;

a first process level manager configured to process at least the first job distributed by the first cluster level manager, wherein processing at least the first job includes:

instantiating, by the first process level manager, a first sandbox environment, loading the first application file into the first sandbox environment, and running the first application file; and a second process level manager configured to process at least the second job distributed by the second cluster level manager, wherein processing at least the second job includes:

instantiating, by the second process level manager, a second sandbox environment, loading the second application file into the second sandbox environment, and running the second application file;

wherein at least one of the first sandbox environment or the second sandbox environment receives an initial memory buffer for use by the first running application file or the second running application file.

2. The system of claim 1, wherein the system further comprises a metrics and accounting module configured to:

track, to generate a usage metric, usage of the processing devices and usage of the memory buffer for processing the first and second jobs, the usage metric indicating a usage not substantially more than the usage of the processing devices and usage of the memory buffer.

3. The system of claim 1, wherein the instructions, when executed by the one or more processing devices cause the one or more processing devices to implement a supervisor configured to:

receive, from a running application file, a request to run another application file;

determine that the running application file has authorization to access the other application file; and permit the request such that the other application file is run within a sandbox environment.

4. The system of claim 1, wherein the instructions, when executed by the one or more processing devices cause the one or more processing devices to implement a supervisor configured to:

receive, from a running application file, a request to access a file;

determine that the running application file does not have authorization to access the file; and deny the request such that the running application file cannot access the file.

5. The system of claim 1, wherein the first sandbox environment is configured to receive a first shell command from the first running application file and perform actions specified by the first shell command, and wherein the second sandbox environment is configured to receive a second shell command from the second running application file and perform actions specified by the second shell command.

6. The system of claim 1, wherein at least one application file includes a scripted module that has no binary compatibility with at least one sandbox environment.

7. The system of claim 6, wherein the at least one application file includes an interpreter configured to interpret the scripted module in the at least one sandbox environment.

8. The system of claim 1, wherein at least one application file includes a just-in-time compiler and another module, the just-in-time compiler configured to compile and run the other module.

9. The system of claim 1, wherein the system is further configured to migrate a running application file to dedicated hard ware that is reserved for completion of work orders.

10. The system of claim 1, wherein the global level manager is under a first administrative control, the first and second work orders are received from a computer under a second administrative control, and a respective output of the first and second work orders is provided to a computer under a third administrative control.

11. The system of claim 10, wherein the first administrative control is controlled by an owner of the system, and where the third administrative control is controlled by a customer of a controller of the second administrative controller.

12. A computer-implemented method comprising:

receiving, by a global level manager of a computing system, a first work order referencing a first application file and a second work order referencing a second application file, the second work order and the second application file being different than the first work order and the first application file;

generating, by the global level manager and from the first work order, a first job associated with the first application file and a second job associated with the second application file;

receiving, by a first cluster level manager of the computing system, the first job, wherein the first cluster level manager indicates, to the global level manager, an availability to accept a job based on available computing resources, and in response, receives and distributes the first job;

receiving, by a second cluster level manager of the computing system, the second job, wherein the second cluster level manager indicates, to the global level manager, an availability to accept a job based on available computing resources, and in response, receives and distributes the second job;

processing, by a first process level manager of the computing system, at least the first job distributed by the first cluster level manager, wherein processing at least the first job includes:

instantiating a first sandbox environment that loads and runs the first application file;

processing, by a second process level manager of the computing system, at least the second job distributed by the second cluster level manager, wherein processing at least the second job includes:
instantiating a second sandbox environment that loads and runs the second application file;
allocating, by the first process level manager, a first memory buffer for use by the first running application file, wherein the first memory buffer is allocated after an application has begun running in the first sandbox environment;
allocating, by the second process level manager, a second memory buffer for use by the second running application file, wherein the second memory buffer is allocated after an application has begun running in the second sandbox environment.

13. The method of claim 12, the method further comprises tracking, to generate a usage metric, usage of one or more processing devices associated with the first or second sandbox environments and usage of at least one memory buffer for processing one or more jobs, the usage metric indicating a usage not substantially more than the usage of the one or more processing devices and usage of the at least one memory buffer.

14. The method of claim 12, wherein the method further comprises:
receiving, from a running application file, a request to run another application file;
determining that the running application file has authorization to access the other application file; and
permitting the request such that the other application file is run within a sandbox environment.

15. The method of claim 12, wherein the method further comprises:
receiving, from a running application file, a request to access a file;
determining that the running application file does not have authorization to access the file; and
denying the request such that the running application file cannot access the file.

16. The method of claim 15, wherein the method further comprises:
receiving a shell command from the running application file; and
performing actions specified by the shell command.

17. The method of claim 12, wherein the method further comprises migrating a running application file to dedicated hardware that is reserved for completion of work orders.

18. The method of claim 12, wherein:
a sandboxing computer system is under a first administrative control, at least one application file is accessed from a computer under a second administrative control, and a client computer system is under a third administrative control.

19. The method of claim 18, wherein:
the first administrative control is controlled by an owner of the sandboxing computer system, and where the third administrative control is controlled by a customer of a controller of the second administrative controller.

* * * * *